(No Model.)
S. H. COTTRELL.
AUTOMATIC BRAKE.
No. 514,644. Patented Feb. 13, 1894.
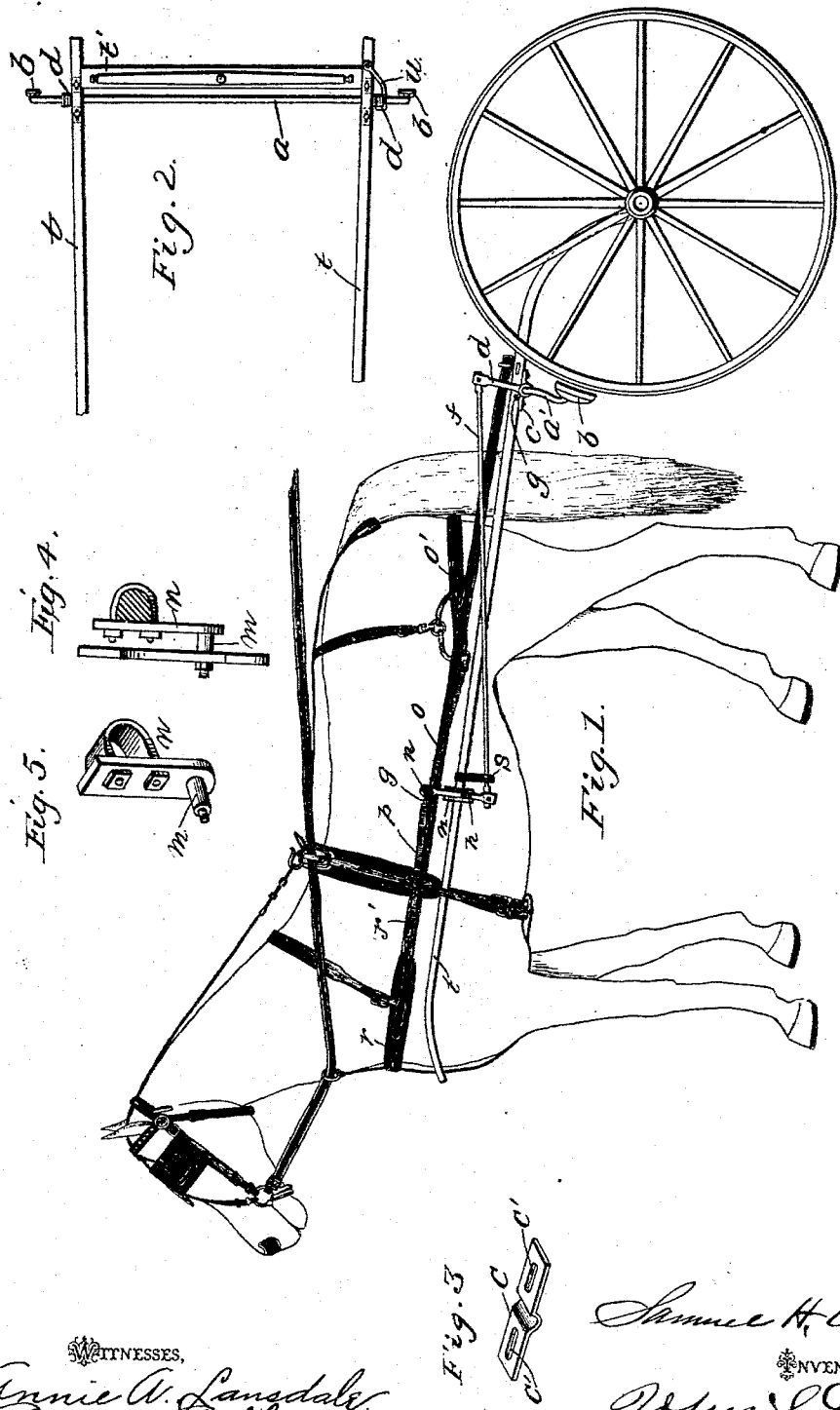

UNITED STATES PATENT OFFICE.

SAMUEL HARVEY COTTRELL, OF JASPER, ALABAMA.

AUTOMATIC BRAKE.

SPECIFICATION forming part of Letters Patent No. 514,644, dated February 13, 1894.

Application filed October 21, 1893. Serial No. 488,799. (No model.)

*To all whom it may concern:*

Be it known that I, SAMUEL HARVEY COTTRELL, a citizen of the United States, residing at Jasper, in the county of Walker and State of Alabama, have invented certain new and useful Improvements in Automatic Brakes; and I do hereby declare the following to be a full, clear, and exact description of the invention, such as will enable others skilled in the art to which it appertains to make and use the same.

My invention is an "automatic brake;" and consists in the novel construction and arrangement of its parts.

In the accompanying drawings: Figure 1 is a side elevation of the front part of a vehicle, the picture of a horse between the shafts and the different parts of my invention. Figs. 2, 3, 4 and 5 are detail views.

My invention is described as follows:

$a$, (Fig. 2) is a brake-rod passing across and under the shafts $t$, just in front of the cross piece $t'$, that holds the singletree. Said brake-rod has its ends $a'$, elbowed and turned downward, and on the lower end of said elbowed ends and just in front of the periphery of the wheels are secured brake-blocks $b$; said brake-rod is secured under said shafts by means of bearings $c$. These bearings are provided with slots $c'$, (Fig. 3) so that said brake-rod and brake-blocks may be adjusted to the wheels.

$d$, is a bar provided with an opening in its lower end sufficiently large to pass over said brake-rod, and is secured to the said brake-rod immediately outside of the shafts and is rigidly secured to said rod by set screws $g$, or in any other suitable and strong manner. Said bars $d$, serve the double purpose of holding the brake-rod $a$, from slipping laterally and acting as levers to throw the brake-blocks $b$, against the periphery of the wheels. The upper ends of said bars $d$, are bifurcated, and in said upper ends are pivoted the rear ends of the connecting rods $f$. Levers $h$, are bifurcated at their lower ends in which are pivoted the front ends of the connecting rods $f$; said levers $h$, are pivoted on the pivots $m$, of the clips $n$. Said clips are secured to the shafts about midway between their points and the singletree. The upper ends of said levers $h$, are provided with a slot or perforation in which are secured the front ends of the "holding back brake straps" $o$, their rear ends being secured to the breech strap $o'$; $p$, are "taking off brake straps" their rear ends being secured to the upper end of the lever $h$, and their front ends to the breast strap $r$, by a buckle or other suitable means. These "taking off brake straps" $p$, are adjustably secured to the breast strap $r$, so as to take the brakes $b$, off just before the traces tighten after going down grade, and where brakes are not needed.

Rubbers $s$, are straps which pass around shafts $t$, and connecting rods $f$, just behind clips $n$, to prevent rattling. Hook $u$, is pivoted on top of shafts $t$, just behind lever $d$, in such a manner as to be hooked around in front of said lever $d$, for preventing the brake from breaking the wheels when backing the vehicle.

Having described my invention, what I claim as new, and desire to secure by Letters Patent, is—

1. In an automatic brake, the combination of the brake-rod $a$, having the elbowed ends $a'$, and brake shoes $b$; slotted bearings $c$, adjustably securing said brake-rod to the shafts $t$; bars $d$, rigidly secured to the brake-rod $a$; connecting rods $f$, their rear ends pivoted to the upper ends of the bars $d$, their front ends to the lower ends of the levers $h$; levers $h$, pivoted to the clips $n$; clips $n$, secured to the shafts; brake straps $o$, their front ends secured to the upper ends of the levers $h$, and their rear ends to the breeching $o'$; "take off brake straps" $p$, their rear ends secured to the upper ends of levers $h$, and their front ends adjustably secured to the breast strap $r$, substantially as shown and described and for the purposes set forth.

2. In an automatic brake, the combination of the brake-rod $a$, having the elbowed ends $a'$, and brake shoes $b$; slotted bearings $c$, adjustably securing said brake-rod to the shafts $t$; bars $d$, rigidly secured to the brake-rod $a$; connecting rods $f$, their rear ends pivoted to the upper ends of the bars $d$, their front ends to the lower ends of the levers $h$; levers $h$, pivoted to the clips $n$; clips $n$, secured to the shafts; brake straps $o$, their front ends secured to the upper ends of the levers $h$, and their rear ends to the breeching $o'$; "take off brake straps" $p$, their rear ends secured to the upper ends of levers $h$, and their front ends adjustably secured to the breast strap $r$; hook $u$, pivoted to the upper face of the shaft $t$, its hook end adapted to hook around and in front of bar $d$, substantially as shown and described and for the purposes set forth.

3. In an automatic brake, substantially as shown and described, the hook $u$, pivoted to the upper face of the shaft $t$, its front end adapted to hook around and in front of bar $d$, substantially as shown and described and for the purposes set forth.

In testimony whereof I affix my signature in presence of two witnesses.

SAMUEL HARVEY COTTRELL.

Witnesses:
ROBT. LEE LITTLE,
MARTIN O'REAR.